United States Patent
Ishizu et al.

(10) Patent No.: US 9,775,047 B2
(45) Date of Patent: Sep. 26, 2017

(54) COMMUNICATION DEVICE AND COMMUNICATION CONTROL METHOD

(71) Applicant: NATIONAL INSTITUTE OF INFORMATION AND COMMUNICATIONS TECHNOLOGY, Koganei-shi, Tokyo (JP)

(72) Inventors: Kentaro Ishizu, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 88 days.

(21) Appl. No.: 14/411,096

(22) PCT Filed: Nov. 21, 2012

(86) PCT No.: PCT/JP2012/007460
§ 371 (c)(1),
(2) Date: Dec. 23, 2014

(87) PCT Pub. No.: WO2014/002155
PCT Pub. Date: Jan. 3, 2014

(65) Prior Publication Data
US 2015/0327075 A1    Nov. 12, 2015

(30) Foreign Application Priority Data
Jun. 25, 2012   (JP) .................................. 2012-142010

(51) Int. Cl.
*H04W 16/14*    (2009.01)
*H04W 64/00*    (2009.01)
*H04W 72/04*    (2009.01)

(52) U.S. Cl.
CPC ......... *H04W 16/14* (2013.01); *H04W 64/003* (2013.01); *H04W 72/048* (2013.01); *H04W 72/0453* (2013.01)

(58) Field of Classification Search
CPC ...................................................... H04W 16/14
See application file for complete search history.

(56) References Cited

U.S. PATENT DOCUMENTS

2010/0142454 A1   6/2010  Chang
2010/0255794 A1  10/2010  Agnew
(Continued)

FOREIGN PATENT DOCUMENTS

CN          102450047 A   5/2012
JP          2012060453 A  3/2012
(Continued)

OTHER PUBLICATIONS

Extended European Search Report dated Feb. 24, 2016, issued in counterpart European Application No. 12879909.5.
(Continued)

*Primary Examiner* — Huy D Vu
*Assistant Examiner* — Teisha D Hall
(74) *Attorney, Agent, or Firm* — Holtz, Holtz & Volek PC (57) ABSTRACT

A plurality of consecutive frequency bands are used as a broadband and use efficiency thereof is improved. An available-frequency-band-information-list is retained such that the list is categorized into frequency-band-groups, each of the groups is a series of consecutive frequency bands, and a frequency-band-number-width is given to each of the groups. Determining a necessary-frequency-band-number, one group is selected from the groups whose width match the number as a first-type band group, when any of the width of each of the groups does not match the number, one group is selected from the groups whose width are next larger than the number as a frequency band group to be used, and a series of consecutive frequency bands corresponding to the number is selected from the frequency band group to be used as a second-type band group. Communication is controlled so as to use the first-type or the second-type band group.

6 Claims, 9 Drawing Sheets

(56) References Cited

U.S. PATENT DOCUMENTS

| | | |
|---|---|---|
| 2010/0304678 A1 | 12/2010 | Chandra et al. |
| 2011/0096770 A1 | 4/2011 | Henry |
| 2011/0237268 A1 | 9/2011 | Tsuda |

FOREIGN PATENT DOCUMENTS

| | | |
|---|---|---|
| JP | 2012528550 A | 11/2012 |
| KR | 1020120030063 A | 3/2012 |
| WO | 2010138935 A2 | 12/2010 |
| WO | 2012032780 A1 | 3/2012 |

OTHER PUBLICATIONS

International Preliminary Report on Patentability (IPRP) including Written Opinion dated Jan. 8, 2015, issued in parent International Application No. PCT/JP2012/007460.

Federal Communications Commission, Unlicensed Operation in the TV Broadcast Bands, Second Memorandum Opinion and Order, FCC, 10-17-4, Sep. 23, 2010.

IEEE802.11af Task Group, http://mentor.ieee.org/802.11/.

IEEE802.19.1 Task Group, http://mentor.ieee.org/802.802.19/documents.

International Search Report (ISR) dated Dec. 18, 2012 issued in International Application No. PCT/JP2012/007460.

Ofcom, Digital Dividend: Cognitive Access, Consultation on License Exempting Cognitive Devices using Interleaved Spectrum, Jul. 2009.

| FREQUENCY BAND (CHANNEL) | AVAILABLE ○/UNAVAILABLE × |
|---|---|
| 13 | ○ |
| 14 | × |
| 15 | ○ |
| 16 | ○ |
| 17 | ○ |
| 18 | × |
| 19 | ○ |
| 20 | ○ |
| 21 | ○ |
| 22 | ○ |
| 23 | × |
| 24 | × |
| 25 | ○ |
| 26 | ○ |
| 27 | × |
| 28 | ○ |
| 29 | × |
| 30 | × |
| 31 | × |
| 32 | ○ |
| 33 | × |
| 34 | ○ |
| 35 | ○ |
| 36 | × |
| 37 | ○ |
| 38 | ○ |
| 39 | ○ |
| 40 | × |
| 41 | × |
| 42 | × |
| 43 | ○ |
| 44 | ○ |
| 45 | × |
| 46 | ○ |
| 47 | × |
| 48 | ○ |
| 49 | × |
| 50 | × |
| 51 | ○ |
| 52 | ○ |

FIG. 3

| FREQUENCY BAND (CHANNEL) | AVAILABLE ○ /UNAVAILABLE × | FREQUENCY BAND GROUP | FREQUENCY BAND NUMBER WIDTH |
|---|---|---|---|
| 13 | ○ | FREQUENCY BAND GROUP 1 | 1 |
| 14 | × | | |
| 15 | ○ | FREQUENCY BAND GROUP 2 | 3 |
| 16 | ○ | SAME AS ABOVE | |
| 17 | ○ | SAME AS ABOVE | |
| 18 | × | | |
| 19 | ○ | FREQUENCY BAND GROUP 3 | 4 |
| 20 | ○ | SAME AS ABOVE | |
| 21 | ○ | SAME AS ABOVE | |
| 22 | ○ | SAME AS ABOVE | |
| 23 | × | | |
| 24 | × | | |
| 25 | ○ | FREQUENCY BAND GROUP 4 | 2 |
| 26 | ○ | SAME AS ABOVE | |
| 27 | × | | |
| 28 | ○ | FREQUENCY BAND GROUP 5 | 1 |
| 29 | × | | |
| 30 | × | | |
| 31 | × | | |
| 32 | ○ | FREQUENCY BAND GROUP 6 | 1 |
| 33 | × | | |
| 34 | ○ | FREQUENCY BAND GROUP 7 | 2 |
| 35 | ○ | SAME AS ABOVE | |
| 36 | × | | |
| 37 | ○ | FREQUENCY BAND GROUP 8 | 3 |
| 38 | ○ | SAME AS ABOVE | |
| 39 | ○ | SAME AS ABOVE | |
| 40 | × | | |
| 41 | × | | |
| 42 | × | | |
| 43 | ○ | FREQUENCY BAND GROUP 9 | 2 |
| 44 | ○ | SAME AS ABOVE | |
| 45 | × | | |
| 46 | ○ | FREQUENCY BAND GROUP 10 | 1 |
| 47 | × | | |
| 48 | ○ | FREQUENCY BAND GROUP 11 | 1 |
| 49 | × | | |
| 50 | × | | |
| 51 | ○ | FREQUENCY BAND GROUP 12 | 2 |
| 52 | ○ | SAME AS ABOVE | |

FIG. 4

| NECESSARY FREQUENCY BAND NUMBER | FREQUENCY BAND GROUP OF CANDIDATE FOR SELECTION |
|---|---|
| 1 | FREQUENCY BAND GROUP 1, FREQUENCY BAND GROUP 5, FREQUENCY BAND GROUP 6, FREQUENCY BAND GROUP 10, FREQUENCY BAND GROUP 11 |
| 2 | FREQUENCY BAND GROUP 4, FREQUENCY BAND GROUP 7, FREQUENCY BAND GROUP 9, FREQUENCY BAND GROUP 12 |
| 3 | FREQUENCY BAND GROUP 2, FREQUENCY BAND GROUP 8 |
| 4 | FREQUENCY BAND GROUP 3 |
| 5 OR MORE | NONE |

| NECESSARY FREQUENCY BAND NUMBER | FREQUENCY BAND GROUP OF CANDIDATE FOR SELECTION |
|---|---|
| 1 | FREQUENCY BAND GROUP 1, FREQUENCY BAND GROUP 5, FREQUENCY BAND GROUP 6, FREQUENCY BAND GROUP 10, FREQUENCY BAND GROUP 11 (ch13) (ch28) (ch32) (ch46) (ch48) |

FIG. 7B

| NECESSARY FREQUENCY BAND NUMBER | FREQUENCY BAND GROUP OF CANDIDATE FOR SELECTION |
|---|---|
| 2 | FREQUENCY BAND GROUP 4, FREQUENCY BAND GROUP 7, FREQUENCY BAND GROUP 9, FREQUENCY BAND GROUP 12 (ch25,26) (ch34,35) (ch43,44) (ch51,52) |

FIG. 7C

| NECESSARY FREQUENCY BAND NUMBER | FREQUENCY BAND GROUP OF CANDIDATE FOR SELECTION |
|---|---|
| 3 | FREQUENCY BAND GROUP 2, FREQUENCY BAND GROUP 8<br>(ch15,16,17)   (ch37,38,39) |

FIG. 7D

| NECESSARY FREQUENCY BAND NUMBER | FREQUENCY BAND GROUP OF CANDIDATE FOR SELECTION |
|---|---|
| 4 | FREQUENCY BAND GROUP 3<br>(ch19,20,21,22) |

FIG. 7E

| NECESSARY FREQUENCY BAND NUMBER | FREQUENCY BAND GROUP OF CANDIDATE FOR SELECTION |
|---|---|
| 5 OR MORE | NONE |

US 9,775,047 B2

COMMUNICATION DEVICE AND COMMUNICATION CONTROL METHOD

TECHNICAL FIELD

The present invention relates to a communication device which is a terminal configured to operate under a television white space (TVWS) environment and to a communication control method thereof, and particularly relates to a communication device and a communication control method thereof which are suitable for improving use efficiency of frequency bands.

BACKGROUND ART

There have been studied wireless communication standards using the same frequency band as a television broadcast being a licensed business but can be operated without such a license. In these standards, a television broadcaster is a primary user, and only when the licensed frequency band of the primary user is not used, a secondary user is allowed to operate wireless communication in this frequency band (unused licensed frequency band=white space).

A communication device of the secondary user used under such an environment makes an inquiry about TV channels to, for example, a dedicated database so as to confirm that no TV signal exists. Specifically, current positional information of the communication device is sent to the database, and a list of usable (effective) frequency bands at this position is obtained from the database. Then, a frequency band to be used is selected from among the frequency bands in the list, and an operation of wireless communication as the secondary user is carried out.

As a mode of frequency band use by such a secondary user, it is conceivable that the communication is performed over a broadband by simultaneously using a plurality of frequency bands (channels) which are consecutive. By this mode, great advantages can be obtained such as performing a communication that is faster or has a very low error rate by giving redundancy. Specifications required by individual communications vary, and thus if such an application is possible, the utility value as a communication system increases.

On the other hand, when such an operation is considered, it is possible that problems occur in securing a plurality of frequency bands consecutive. Specifically, it is highly possible that many of the individual communications are a communication which only needs a single frequency band, and if frequency bands are allocated for these communications without planning, probability that a plurality of necessary frequency bands consecutive can be secured between allocated frequency bands becomes low. That is, it is possible that the lineup of available frequency bands fragments disorderly.

PRIOR ART DOCUMENT

Non-Patent Document

Non-patent Document 1: IEEE802.11af Task Group, http://mentor.ieee.org/802.11/
Non-patent Document 2: IEEE802.19.1 Task Group, http://mentor.ieee.org/802.802.19/documents
Non-patent Document 3: Federal Communications Commission, Unlicensed Operation in the TV Broadcast Bands, Second Memorandum Opinion and Order, FCC, 10-17-4, Sep. 23, 2010.
Non-patent Document 4: Ofcom, Digital Dividend: Cognitive Access, Consultation on License Exempting Cognitive Devices using Interleaved Spectrum, July 2009.

SUMMARY OF THE INVENTION

Problems to be Solved by the Invention

It is an object of the present invention to provide a communication device which is a terminal configured to operate under a television white space environment and a communication control method thereof, the communication device and the communication control method thereof being capable of allowing use of a plurality of frequency bands consecutive as a broadband and, in this case, improving use efficiency of frequency bands.

Means for Solving the Problems

In order to solve the above problems, a communication device as one aspect of the present invention is a communication device having a communication function unit, the communication device including: a storing unit configured to store and retain an available frequency band information list indicating available frequency bands such that the available frequency bands listed in the list are categorized into frequency band groups, each of the groups can be seen as a series of consecutive frequency bands, and a number of frequency bands included in each of the frequency band groups is given to each of the frequency band groups as a frequency band number width; a determining unit configured to, based on specifications of a communication to be performed, determine a number of frequency bands according to a bandwidth necessary for the communication as a necessary frequency band number; a first selecting unit configured to select one frequency band group from among the frequency band groups whose frequency band number width match the necessary frequency band number listed in the available frequency band information list, as a first-type use frequency band group being a frequency band group to be used; a second selecting unit configured to, when any of the frequency band number width of the each of the frequency band groups in the available frequency band information list does not match the necessary frequency band number, select one frequency band group from among the frequency band groups whose frequency band number width are larger than and next close to the necessary frequency band number listed in the available frequency band information list, as a frequency band group containing a frequency band to be used; a third selecting unit configured to select a series of consecutive frequency bands corresponding to the necessary frequency band number from among the frequency band group containing the frequency band to be used as a second-type use frequency band group; and a controlling unit configured to control the communication function unit so as to perform the communication using the first-type use frequency band group or the second-type use frequency band group.

This communication device can store and retain an available frequency band information list indicating available frequency bands such that available frequency bands listed in the available frequency band information list are categorized into frequency band groups, each of which can be seen as a series of consecutive frequency bands, and a number of frequency bands included in each of the frequency band groups is given to each of the frequency band groups as a frequency band number width. Then, based on specifications of a communication to be performed, a number of frequency bands according to a bandwidth necessary for the communication is determined as a necessary frequency band number.

Next, this communication device selects one frequency band group from among the frequency band groups whose frequency band number width match the necessary frequency band number listed in the available frequency band information list, as a use frequency band group (first-type use frequency band group) which is a frequency band group to be used. Thus, it becomes a planned and economical allocation of frequency bands. That is, this use frequency band group has a frequency band number width matching the necessary frequency band number, and meanwhile is seen as a series of consecutive frequency bands among the available frequency bands, and does not affect other series of consecutive use frequency bands. Therefore, in the other frequency bands, independently they can be usable without getting any adverse effects.

Note that when any of the frequency band number width of the each of the frequency band groups in the available frequency band information list does not match the necessary frequency band number, one frequency band group is selected from among frequency band groups whose frequency band number width are larger than and next close to the necessary frequency band number listed in the available frequency band information list, as a frequency band group containing a frequency band to be used. Then, a series of consecutive frequency bands corresponding to the necessary frequency band number is selected from among the frequency band group to be used as a second-type use frequency band group. In this case, a selection of the second best frequency bands is made, but it still does not affect other series of consecutive frequency bands. Therefore, in this frequency band, use of a separate frequency band is possible without any adverse effects.

Further, a communication control method as another aspect of the present invention is a communication control method in a communication device having a communication function unit, the communication control method including: storing and retaining an available frequency band information list indicating available frequency bands such that the available frequency bands listed in the list are categorized into frequency band groups, each of the groups can be seen as a series of consecutive frequency bands, and a number of frequency bands included in each of the frequency band groups is given to each of the frequency band groups as a frequency band number width; determining, based on specifications of a communication to be performed, a number of frequency bands according to a bandwidth necessary for the communication as a necessary frequency band number; selecting one frequency band group from among the frequency band groups whose frequency band number width match the necessary frequency band number listed in the available frequency band information list, as a first-type use frequency band group being a frequency band group to be used; selecting, when any of the frequency band number width of the each of the frequency band groups in the available frequency band information list does not match the necessary frequency band number, one frequency band group from among the frequency band groups whose frequency band number width are larger than and next close to the necessary frequency band number listed in the available frequency band information list, as a frequency band group containing a frequency band to be used; selecting a series of consecutive frequency bands corresponding to the necessary frequency band number from among the frequency band group containing the frequency band to be used as a second-type use frequency band group; and controlling the communication function unit so as to perform the communication using the first-type use frequency band group or the second-type use frequency band group.

This communication control method is a control method complying with the above-described communication device.

Further, a communication device as a still another aspect of the present invention is a communication device having a communication function unit, the communication device including: a specifying unit configured to specify a geographical position where an own device exists; a determining unit configured to, based on specifications of a communication to be performed, determine a number of frequency bands according to a bandwidth necessary for the communication as a necessary frequency band number; a transmitting unit configured to transmit the geographical position and the necessary frequency band number to a database; a receiving unit configured to receive a list sent from the database as information according to the geographical position and the necessary frequency band number, the list indicating one or more frequency band groups constituted of a series of consecutive available frequency bands whose series number matches the necessary frequency band number or is larger than the necessary frequency band number; a first selecting unit configured to select one frequency band group from among the frequency band groups whose series number matches the necessary frequency band number listed in the list, as a first-type use frequency band group being a frequency band group to be used; a second selecting unit configured to, when any of the series number of each of the frequency band groups in the list does not match the necessary frequency band number, select one frequency band group from among the frequency band groups whose series number are larger than the necessary frequency band number listed in the list, as a frequency band group containing a frequency band to be used; a third selecting unit configured to select a series of consecutive frequency bands corresponding to the necessary frequency band number from among the frequency band group containing the frequency band to be used as a second-type use frequency band group; and a controlling unit configured to control the communication function unit so as to perform the communication using the first-type use frequency band group or the second-type use frequency band group.

This communication device can determine, based on specifications of a communication to be performed, a number of frequency bands according to a bandwidth necessary for the communication as a necessary frequency band number, and can transmit an inquiry including the geographical position of the device and the necessary frequency band number to a database. From the database, a list indicating one or more frequency band groups constituted of a series of consecutive available frequency bands whose series number matches the necessary frequency band number or is larger than the necessary frequency band number is obtained.

Next, this communication device selects one frequency band group from among the frequency band groups whose series number match the necessary frequency band number listed in the list, as a frequency band group (first-type use frequency band group) which is to be used. Thus, planned and economical use of frequency bands can be performed. That is, a premise that this first-type use frequency band group has a frequency band number width matching the necessary frequency band number, and meanwhile is seen by a database as a series of consecutive frequency bands among the available frequency bands, can be assumed. In this case, the above-described selection does not affect other series of consecutive frequency bands. Therefore, in this frequency band, use of a separate frequency band is possible without any adverse effects.

Note that when any of the series number of each of the frequency band groups in the list does not match the necessary frequency band number, one frequency band group is selected from among the frequency band groups whose series number are larger than the necessary frequency band number listed in the list, as a frequency band group containing a frequency band to be used. Then, a series of consecutive frequency bands corresponding to the necessary frequency band number is selected from among the frequency band group containing the frequency band to be used as a second-type use frequency band group. In this case, a selection of the second best frequency bands is made, but the selection of them still does not affect other series of consecutive frequency bands. Therefore, in the other frequency bands, independently they can be usable without getting any adverse effects.

Effect of the Invention

According to the present invention, it is possible to provide a communication device which is a terminal configured to operate under a television white space environment and a communication control method thereof, the communication device and the communication control method thereof being capable of allowing use of a plurality of frequency bands consecutive as a broadband and, in this case, improving use efficiency of frequency bands.

MODES FOR CARRYING OUT THE INVENTION

As a mode of the present invention, there can be further included: a specifying unit configured to specify a geographical position where an own device exists; a transmitting unit configured to transmit the geographical position to a database; a receiving unit configured to receive a second-type available frequency band information list sent from the database as information according to the geographical position before the available frequency band information list is stored and retained, the second-type available frequency band information list indicating the available frequency bands with a form not being categorized into the frequency band groups and not being given the frequency band number width, to form part of the available frequency band information list; a categorizing unit configured to, by checking a disposition of the available frequency bands listed in the second-type available frequency band information list, categorize each of the available frequency bands into second-type frequency band groups, each of the groups can be seen as a series of consecutive frequency bands, so as to obtain the frequency band groups; and a giving unit configured to give to each of the second-type frequency band groups a number of frequency bands included in the each of the second-type frequency band groups, the number corresponding to the frequency band number width.

In this mode, the geographical position of the device is sent to the database for inquiry, and from the database there is obtained an available frequency band information list (second-type available frequency information list) which indicates the available frequency bands with a form not being categorized into the frequency band groups and not being given the frequency band number width. Then, in this communication device, a disposition of the available frequency bands listed in the second-type available frequency band information list is checked and each of the available frequency bands is categorized into second-type frequency band groups, each of which can be seen as a series of consecutive frequency bands. The second-type frequency band groups can be treated as frequency band groups for storage and retention. Moreover, to each of the second-type frequency band groups a number of frequency bands included in the second-type frequency band group is given in a manner that it corresponds to the frequency band number width for storage and retention.

That is, this mode is to perform, in the communication device, categorizing into the frequency band groups for the available frequency band information list, and counting the frequency band number widths and giving width information to these groups, in order to reduce a load on the database as much as possible.

Further, as a mode, there can be further included: a specifying unit configured to specify a geographical position where an own device exists; a transmitting unit configured to transmit the geographical position to a database; and a receiving unit configured to receive the available frequency band information list transmitted from the database as information according to the geographical position, the list being categorized into the frequency band groups and being given the frequency band number width.

This mode is to perform, in the database conversely to the above mode, categorizing into the frequency band groups for the available frequency band information list, and counting the frequency band number widths and giving width information to these groups. Therefore, a load on the side of the communication device can be reduced accordingly.

As a mode, there can be further included: a generating unit configured to, by performing frequency sensing in surroundings of an own device, generate a second-type available frequency band information list indicating the available frequency bands with a form not being categorized into the frequency band groups and not being given the frequency band number width, to form part of the available frequency band information list; a categorizing unit configured to, by checking a disposition of the available frequency bands listed in the second-type available frequency band information list, categorize each of the available frequency bands into second-type frequency band groups, each of the groups can be seen as a series of consecutive frequency bands, so as to obtain the frequency band groups; and a giving unit configured to give to each of the second-type frequency band groups a number of frequency bands included in the each of the second-type frequency band groups, the number corresponding to the frequency band number width.

This mode does not use the database to obtain the available frequency band information list and obtains it by performing frequency sensing in surroundings of the own device. Although a load increases as a communication device, the available frequency band information list can be obtained without the database, and moreover, subsequently, a plurality of consecutive frequency bands can be used as a broadband and, in this case, use efficiency of frequency bands can be improved.

Figure 1:
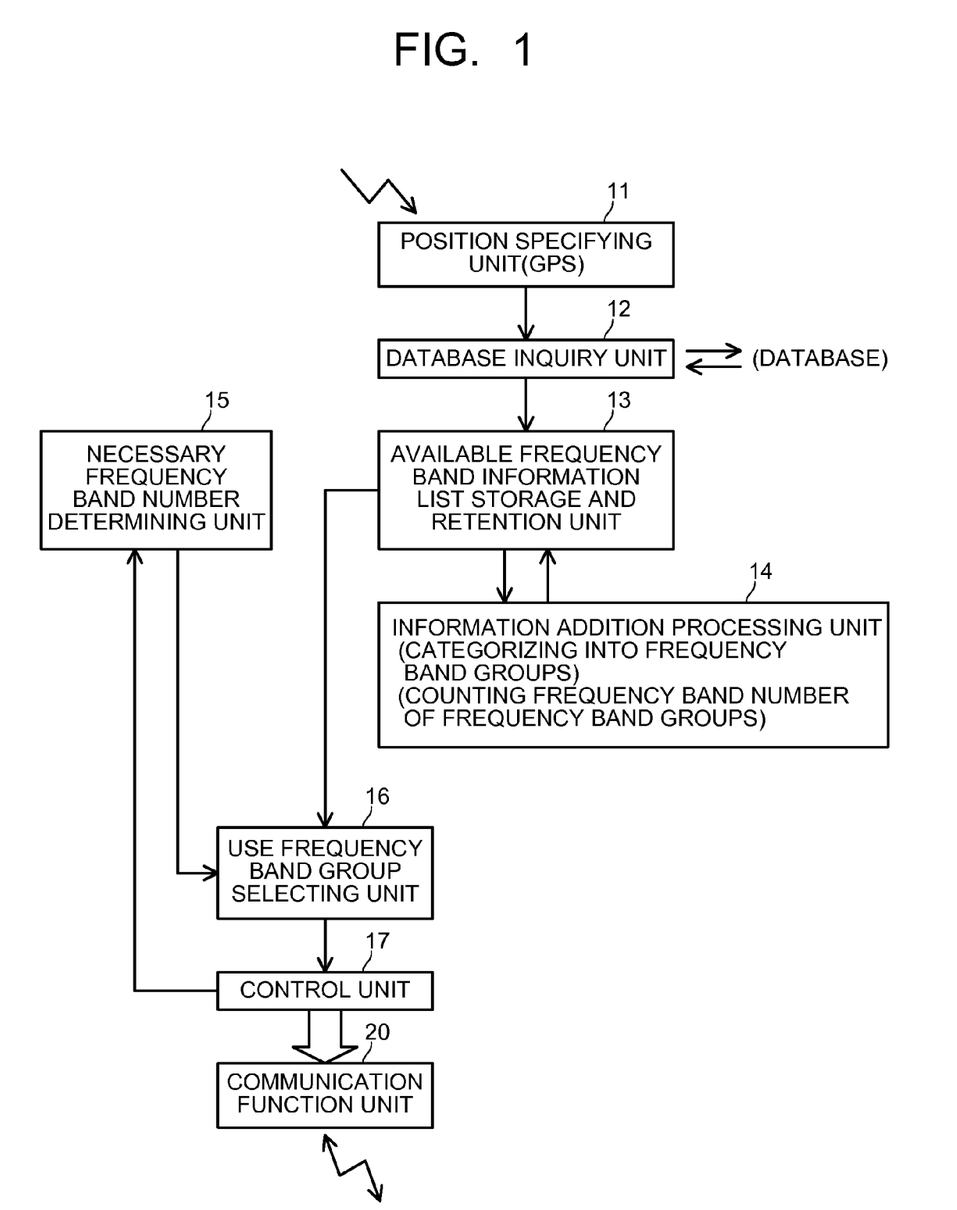
FIG. 1 is a functional block diagram illustrating a configuration of a communication device as one embodiment of the present invention.

Based on the above, embodiments of the present invention will be described below with reference to drawings. FIG. 1 is a functional block diagram illustrating a configuration of a communication device as one embodiment of the present invention. As illustrated in this diagram, this communication device has a position specifying unit 11, a database inquiry unit 12, an available frequency band information list storage and retention unit 13, an information addition processing unit 14, a necessary frequency band number determining unit 15, a use frequency band group selecting unit 16, a control unit 17, and a communication function unit 20.

Figure 2:
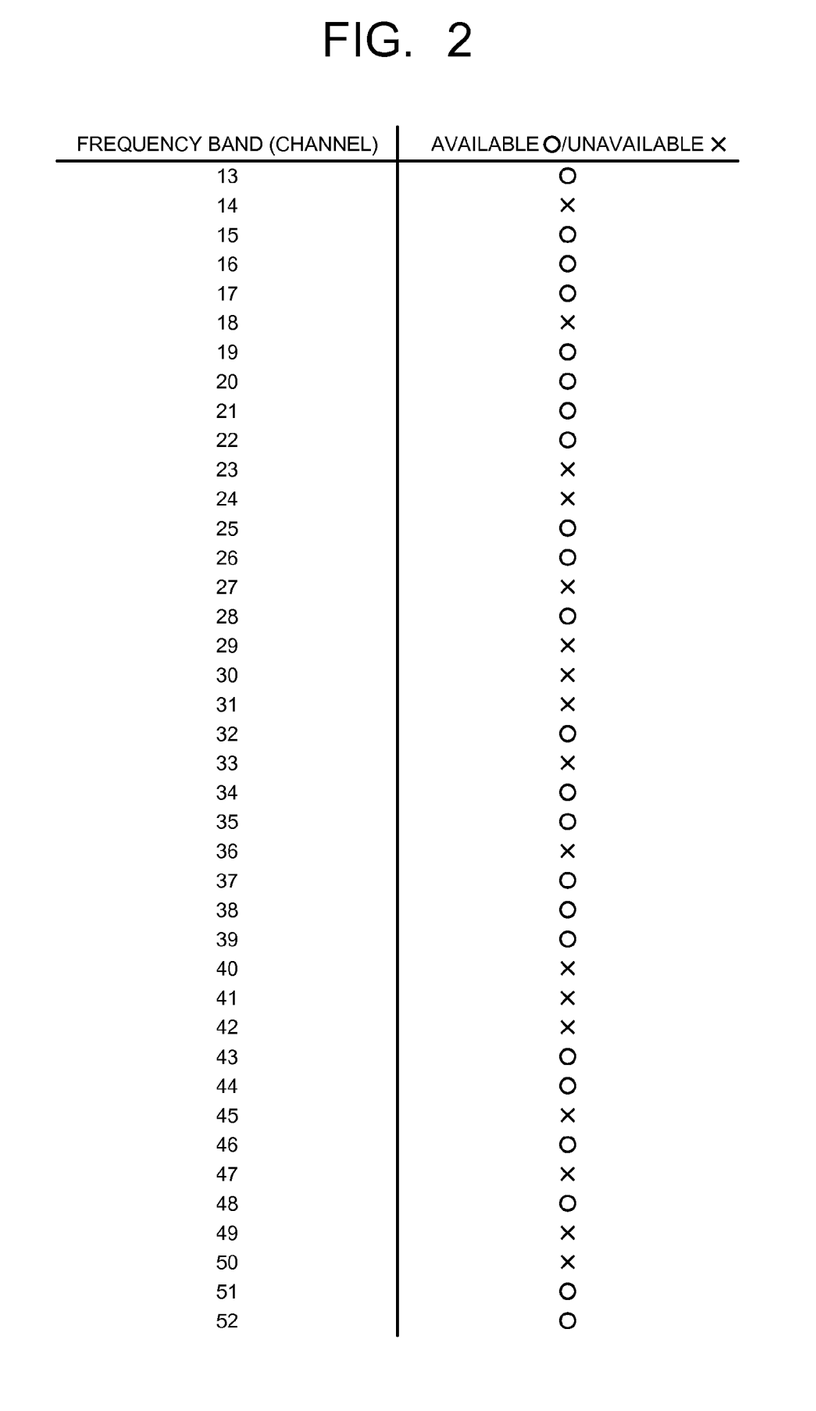
FIG. 2 is an explanatory diagram illustrating an example of an available frequency band information list stored and retained first by an available frequency band information list storage and retention unit 13 illustrated in FIG. 1.
Figure 3:
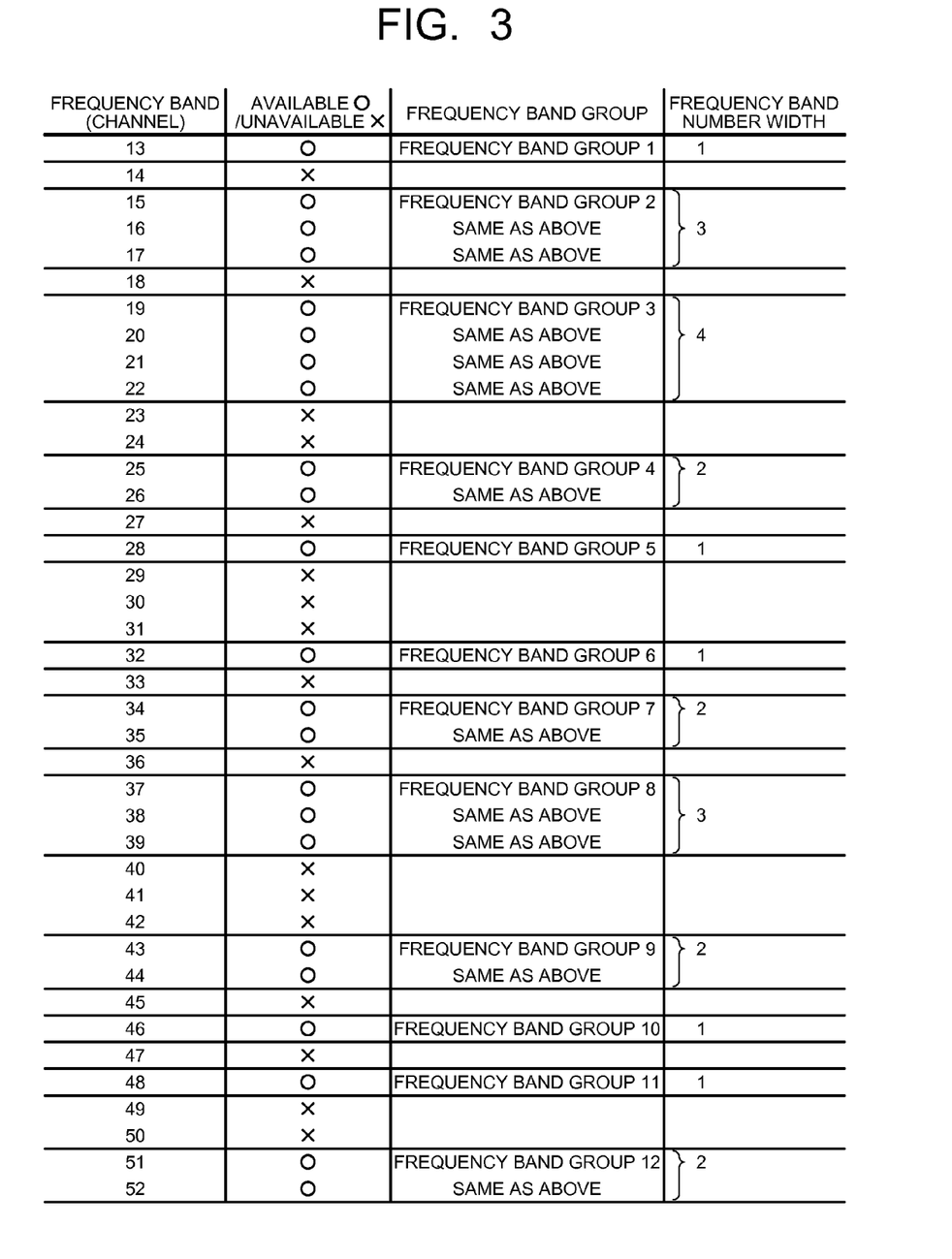
FIG. 3 is an explanatory diagram illustrating an example of the available frequency band information list stored and retained next by the available frequency band information list storage and retention unit 13 illustrated in FIG. 1.
Figure 4:
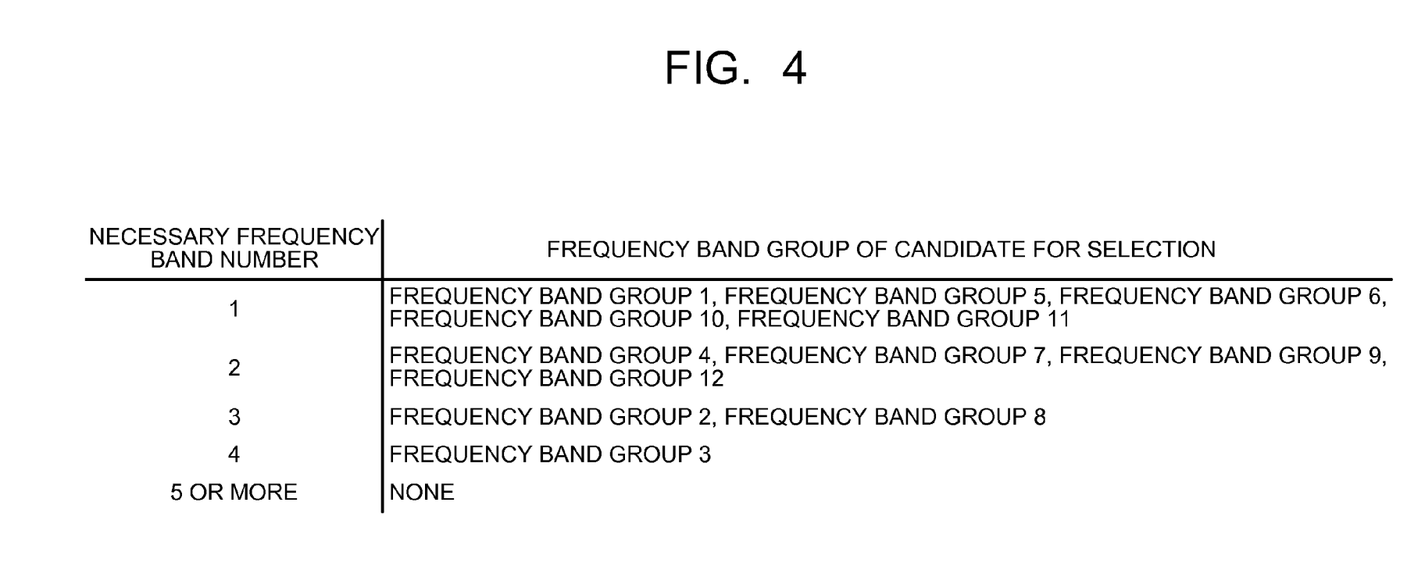
FIG. 4 is an explanatory diagram illustrating candidates for frequency band groups which can be selected by a use frequency band group selecting unit 16 illustrated in FIG. 1 according to the necessary frequency band number.

FIG. 1 illustrates a functional block diagram, but when an operation of each configuration in this diagram is described below, FIG. 2 to FIG. 4 are referred as appropriate.

The position specifying unit 11 specifies the current geographical position of the own device by using, for example, a GPS satellite. The specified geographical position is passed to the database inquiry unit 12. The database inquiry unit 12 transmits the geographical position passed from the position specifying unit 11 to the database, and makes an inquiry about available frequency bands at this position (and additionally, in some cases, various use conditions besides maximum transmission power thereof).

This database is a server provided on the Internet to provide at least information related to frequency bands, which can be used without affecting primary users, to a communication device (secondary user) which can be operated under the TVWS environment. Regarding the available frequency bands returned therefrom, it is necessary that at least the primary user is not affected, but it is also possible to have an assumption that a frequency band that is already allocated to another secondary user is excluded.

From the database, for example, information (available frequency band information list) related to available frequency bands as illustrated in FIG. 2 is returned. Here, a "channel" is considered as one having the same meaning as the "frequency band". This is because a frequency band used by the primary user is normally divided into "channels" (for example, one channel has a width of 6 MHz for transmitting a television signal). Hereinafter, such a "channel" is assumed as the "frequency band", but it is also possible likewise to consider a smaller band (having a width of 1 MHz for example) as the "frequency band", without being limited to the "channel". Note that in FIG. 2, the "various use conditions besides maximum transmission power" are omitted from illustration.

The database inquiry unit 12 passes the available frequency band information list obtained from the database to the available frequency band information list storage and retention unit 13. Based on this, this storage and retention unit 13 stores and retains an available frequency band information list as illustrated in FIG. 2 for example. That is, FIG. 2 illustrates an example of the available frequency band information list stored and retained first by the available frequency band information list storage and retention unit 13 illustrated in FIG. 1. The available frequency band information list storage and retention unit 13 passes the stored and retained list to the information addition processing unit 14.

The information addition processing unit 14 uses the available frequency band information list passed from the list storage and retention unit 13 to check a disposition of available frequency bands listed in this available frequency band information list and categorize available frequency bands into frequency band groups, each of which can be seen as a series of consecutive frequency bands. Then, moreover, for each of the frequency band groups a number of frequency bands included therein is counted and to each the number is given as the frequency band number width.

The operation of the information addition processing unit 14 as above is, taking the available frequency band information list as illustrated in FIG. 2 as an example, to create a list to which information is added as illustrated in FIG. 3 from this list. The added information is, as illustrated, about which "frequency band group" an available frequency band (available channel) belongs to, and how many frequency bands are included in these "frequency band groups" ("frequency band number width"). Note that although it sounds somewhat incompatible to call a frequency band whose frequency band number width is 1 as a "frequency band group", it will be used also below for convenience of generalized explanation.

The list to which information is added in the information addition processing unit 14 is passed from the information addition processing unit 14 to the available frequency band list storage and retention unit 13, and is stored and retained therein again. FIG. 3 illustrates, specifically, an example of the available frequency band information list stored and retained next by the available frequency band information list storage and retention unit 13 illustrated in FIG. 1. Then, furthermore, the list stored and retained again is passed from the storage and retention unit 13 to the use frequency band group selecting unit 16.

Based on specifications of a communication to be performed, the necessary frequency band number determining unit 15 determines a frequency band number according to a bandwidth needed for the communication as a necessary frequency band number. For the communication to be performed, information can be obtained from the control unit 17 which controls the communication function unit 20. For example, it is a determination such that one channel will suffice, or the amount of two channels is necessary for a wider bandwidth. Information of the determined necessary frequency band number is passed to the use frequency band group selecting unit 16.

The use frequency band group selecting unit 16 selects one frequency band group from among the frequency band groups, which are listed in the available frequency band information list passed from the storage and retention unit 13 and have a frequency band number width matching the necessary frequency band number brought from the determining unit 15, as a use frequency band group which is a frequency band group to be used.

Such an operation of the use frequency band group selecting unit 16 will be further described with reference to FIG. 4 as follows. FIG. 4 is an explanatory diagram illustrating candidates for frequency band groups which can be selected by the use frequency band group selecting unit 16 illustrated in FIG. 1 according to the necessary frequency band number. When the available frequency band information list passed from the storage and retention unit 13 is as illustrated in FIG. 3 for example, the selecting unit 16 can implicitly create a list as in FIG. 4 as a list corresponding to the necessary frequency band number to be brought from the determining unit 15. Then, if the necessary frequency band number brought from the determining unit 15 is 1 for example, there are five frequency band groups to be candidates for selection: frequency band groups 1, 5, 6, 10, 11, with reference to FIG. 4.

Therefore, in this case, the use frequency band group selecting unit 16 selects one frequency band group from among these candidates. Regarding what candidate is to be selected specifically, for example, based on the "various use conditions besides maximum transmission power" described above, a selection can be made by adding a view point that the operation becomes more advantageous.

Similarly, if the necessary frequency band number brought from the determining unit 15 is 2, 3, 4, or 5 (or more), frequency band groups to be candidates for selection are four frequency band groups 4, 7, 9, 12, two frequency band groups 2, 8, a frequency band group 3 (one), or none, respectively, as illustrated in FIG. 4. Selecting from among the candidates is the same as the above explanation. Information of the frequency band groups selected by the selecting unit 16 is passed to the control unit 17.

Note that in general, it is also conceivable that no frequency band group having the frequency band number width matching the necessary frequency band number exists in the available frequency band information list. An example is the case where the necessary frequency band number is 1 but there is no frequency band group with the frequency band number width of 1 in the list, and all groups therein are frequency band groups with a frequency band number width of 2 or more.

In such a case, from among frequency band groups (frequency band groups 4, 7, 9, 12) which have a frequency band number width (for example 2) larger than the necessary frequency band number and next close to the necessary frequency band number, one frequency band group is selected as a use frequency band group containing frequency bands to be used. The reason why it is called the "use frequency band group containing frequency bands to be used" is that the frequency bands to be actually used becomes a part of the group. Then, in this case, a series of consecutive frequency bands corresponding to the necessary frequency band number is selected from among the frequency bands belonging to the use frequency band group containing the frequency bands to be used as a use frequency band group. When the use frequency band group is selected by the selecting unit 16 in this manner, information thereof is passed to the control unit 17.

Incidentally, as to which series of frequency bands should be selected from among the frequency bands belonging to the use frequency band group containing the frequency bands to be used, selecting from an end of the frequency bands belonging to the group as much as possible does not cause fragmentation of available frequency bands and hence is considered preferable from the viewpoint of improving use efficiency of frequency bands.

The control unit 17 controls the communication function unit 20 based on information of the use frequency band group passed from the use frequency band group selecting unit 16. That is, the communication function unit 20 performs wireless transmission/reception using this use frequency band group. The communication function unit 20 is a functional unit responsible for original communication function, and is configured to perform a communication as a broadband by simultaneously using a plurality of consecutive frequency bands (channels) in some cases (or fixedly).

As described above, the configuration and basic operations of one embodiment have been described. With this communication device, planned and economical utilization of frequency bands is possible. That is, this use frequency band group has a frequency band number width matching the necessary frequency band number, and meanwhile is seen as a series of consecutive frequency bands separated by unavailable frequency bands, among the available frequency bands. Such selection of use frequency bands does not affect other series of consecutive available frequency bands. Therefore, in the other frequency bands, independently they can be usable without getting any adverse effects.

When described illustratively with reference to FIG. 3, the above points will be as follows. For example, when the necessary frequency band number is 1, one frequency band group is selected as the use frequency band group from among the frequency band groups 1, 5, 6, 10, 11. Therefore, after this selection, any frequency band group with a frequency band number width of 2 or more is kept as it is as an available frequency band group, securing options for other secondary users who attempt to perform communication over such a broadband. In this frequency bands, independently they can be usable without getting any adverse effects.

On the other hand, if a use frequency band is selected without any limitation when the necessary frequency band number is 1, decrease in frequency band groups having a frequency band number width of 2 or more has to be accepted. Therefore, it is possible that options for other secondary users are narrowed, which is no longer an economical use of frequency bands. The case where the necessary frequency band number is 2 or more is exactly the same.

Next, a modification example of the above-described embodiment will be described. As one modification example, a mode not having the information addition processing unit 14 can be considered. Of course, in this case, it is premised that, as the function on the database side, the list as illustrated in FIG. 3 is returned instead of the list illustrated in FIG. 2 in response to an inquiry from the database inquiry unit 12. In this case, the load on the communication device side decreases and the load on the database side increases, but changing to the list as illustrated in FIG. 3 by adding information to the list illustrated in FIG. 2 cannot really be said to be a heavy load and hence can be considered easy to be realized. Note that in this case, it is not necessary to make any particular change to the information to be sent for inquiry to the database.

Figure 5:
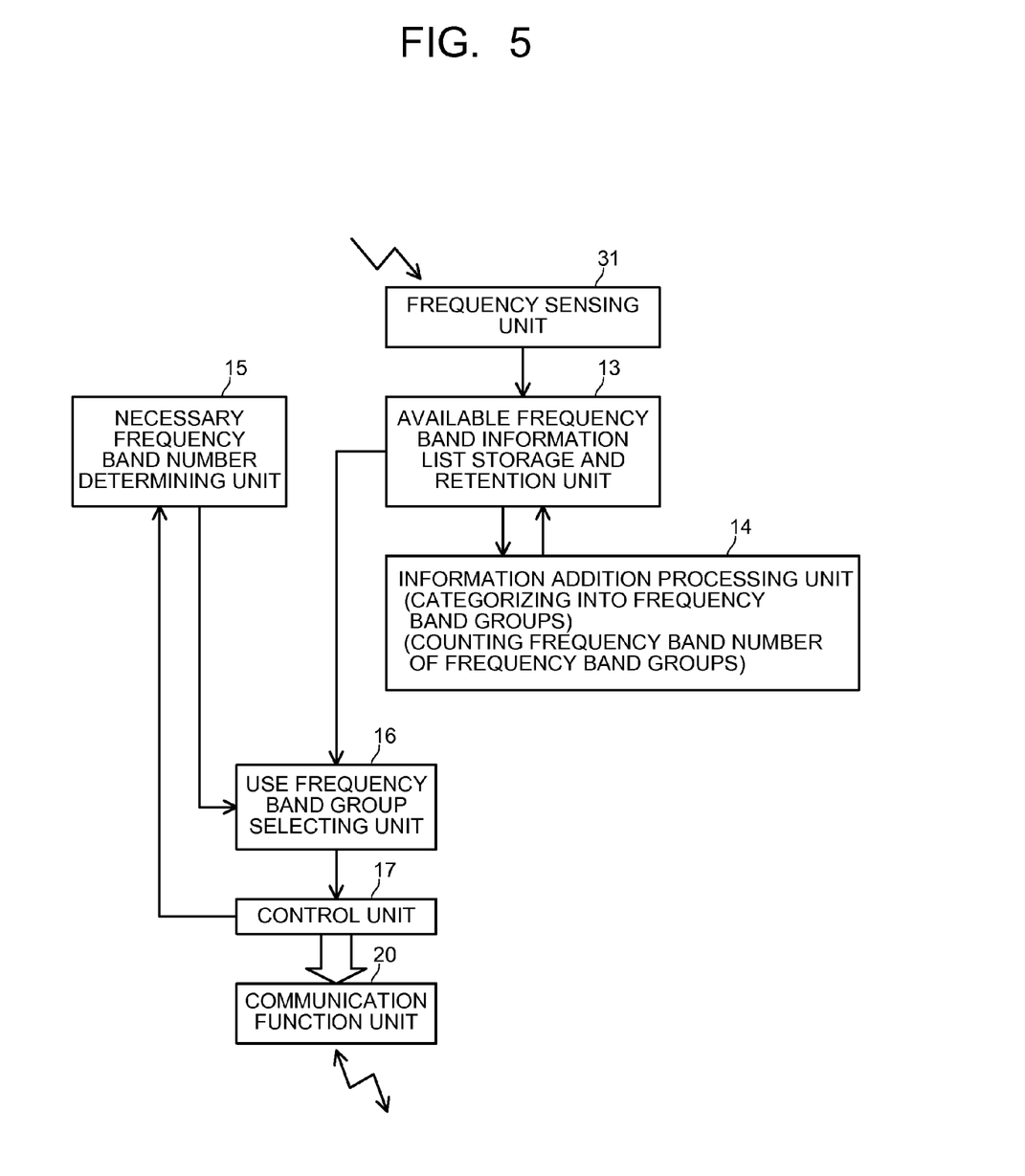
FIG. 5 is a functional block diagram illustrating a configuration of a communication device which is another embodiment of the present invention.

Next, another embodiment will be described with reference to FIG. 5. FIG. 5 is a functional block diagram illustrating a configuration of a communication device which is another embodiment. In this diagram, components illustrated in already described diagrams are given the same numerals, and descriptions thereof are omitted.

This embodiment has a frequency sensing unit 31 instead of the position specifying unit 11 and the database inquiry unit 12. The frequency sensing unit 31 performs frequency sensing in surroundings of the own device, and detects frequency bands which can be used at least without affecting the primary user. Then, by this sensing, the available frequency band information list is created. Regarding the frequency sensing, various known methods can be used. The created list (for example one as illustrated in FIG. 2) is passed to the available frequency band information list storage and retention unit 13 and stored and retained therein.

The operation thereafter is as already described. Therefore, the operation and effect thereof are the same as those in the embodiment described with reference to FIG. 1. This embodiment is considered to have a load of frequency sensing that is not light, but when there is no database or the database is unavailable due to communication failure or equipment failure, the same effect as the embodiment described with reference to FIG. 1 can be obtained.

Figure 6:
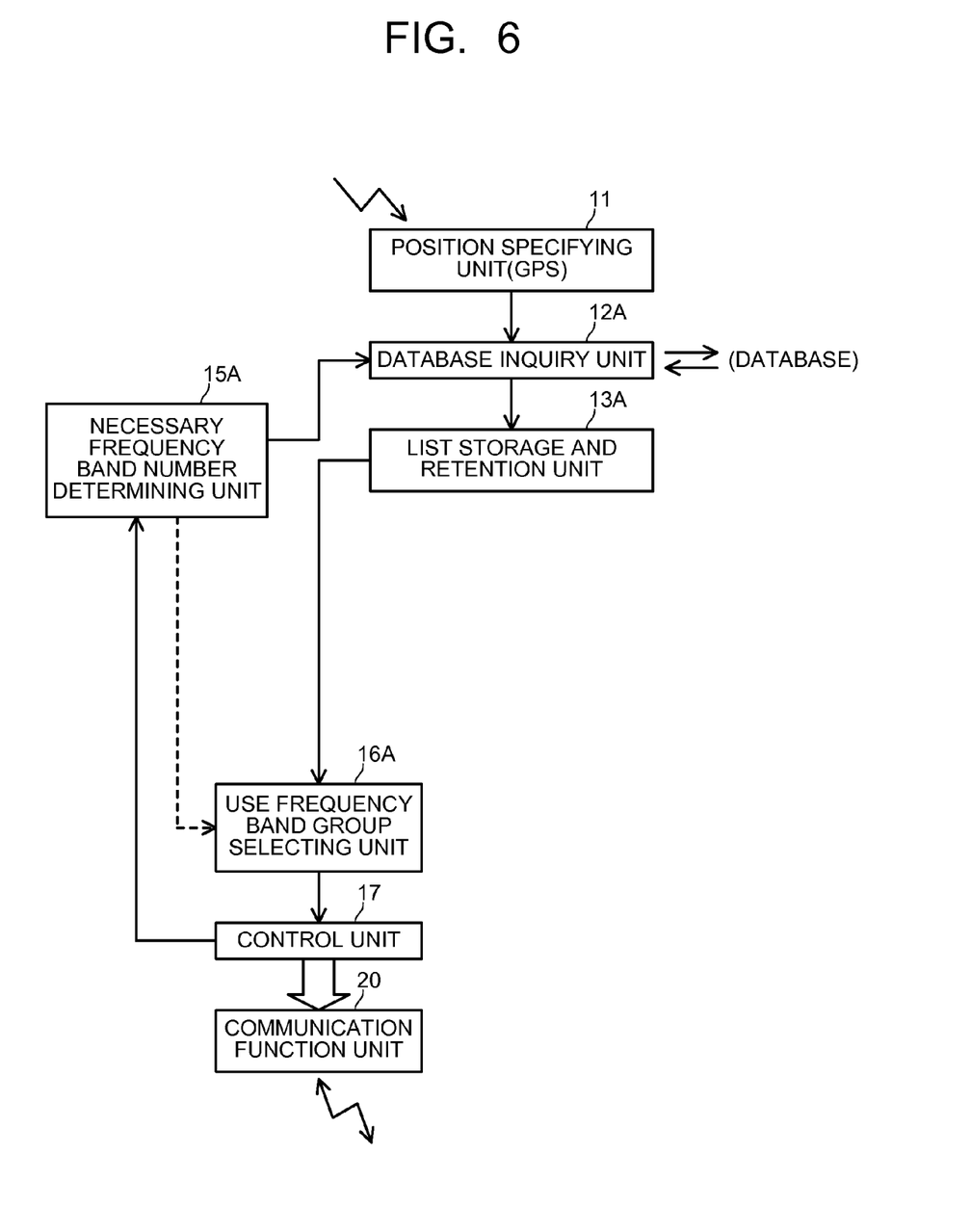
FIG. 6 is a functional block diagram illustrating a configuration of a communication device which is still another embodiment of the present invention.
Figure 7A:
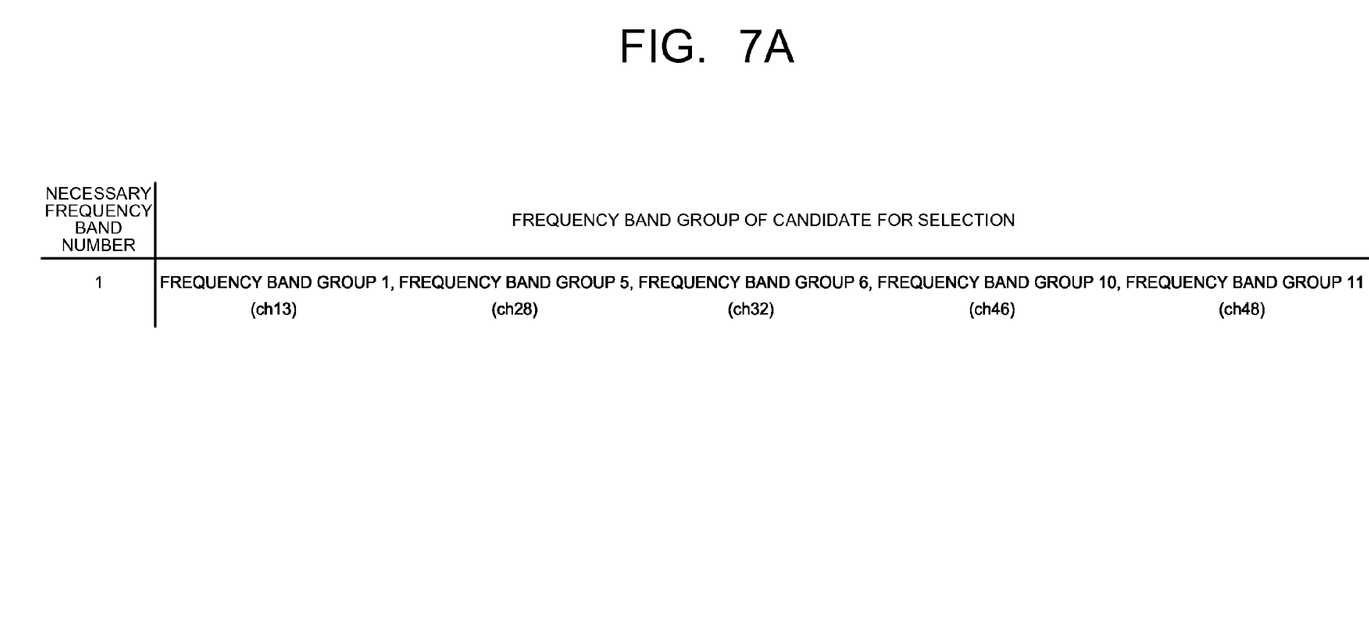
FIG. 7A is an explanatory diagram illustrating candidates for frequency band groups which can be selected by a use frequency band group selecting unit 16A illustrated in FIG. 6.
Figure 7B:
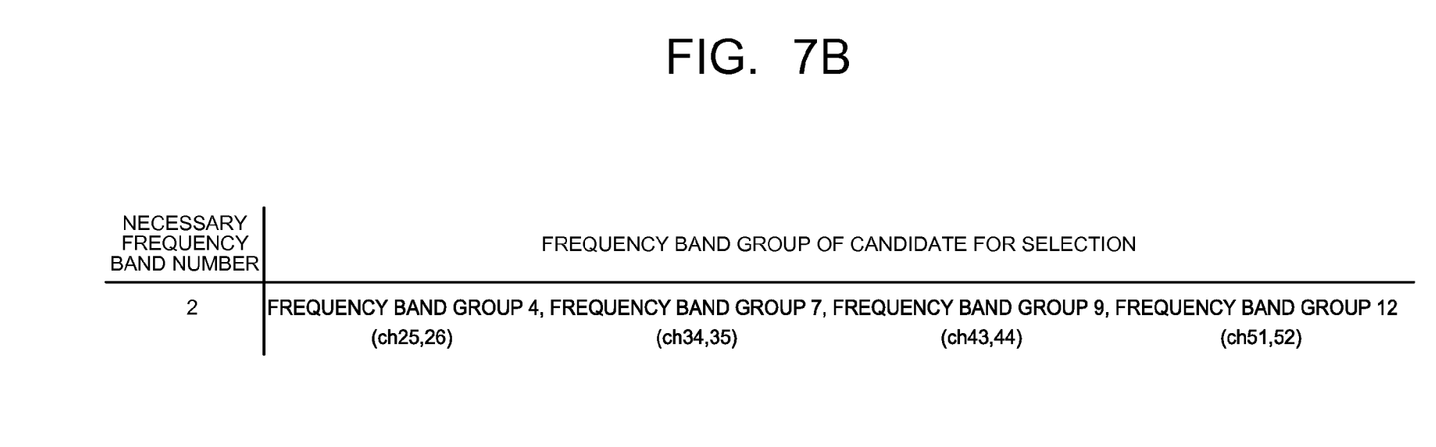
FIG. 7B is an explanatory diagram illustrating candidates for frequency band groups which can be selected by the use frequency band group selecting unit 16A illustrated in FIG. 6.
Figure 7C:
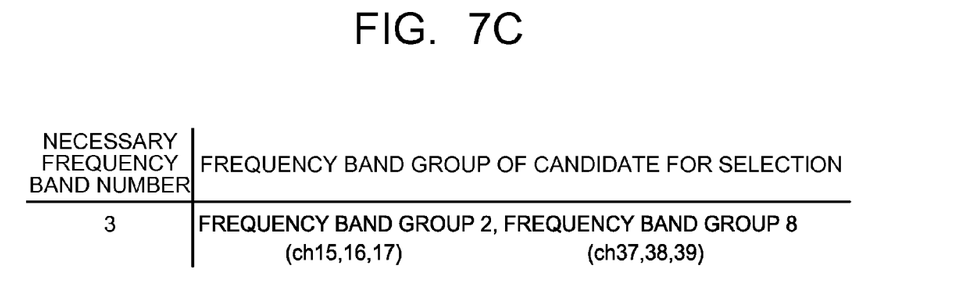
FIG. 7C is an explanatory diagram illustrating candidates for frequency band groups which can be selected by the use frequency band group selecting unit 16A illustrated in FIG. 6.
Figure 7D:
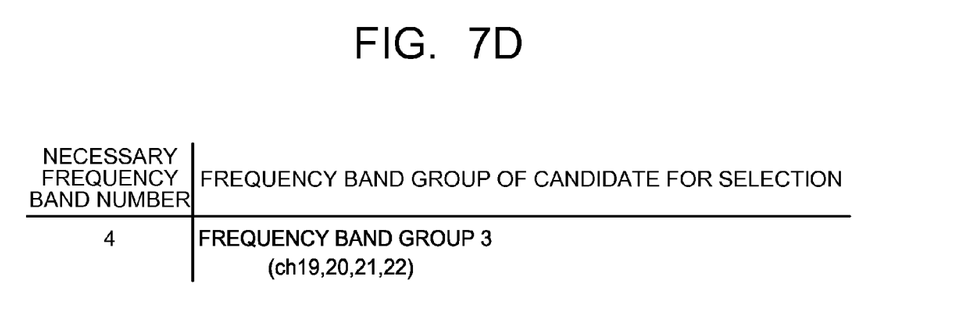
FIG. 7D is an explanatory diagram illustrating candidates for frequency band groups which can be selected by the use frequency band group selecting unit 16A illustrated in FIG. 6.
Figure 7E:
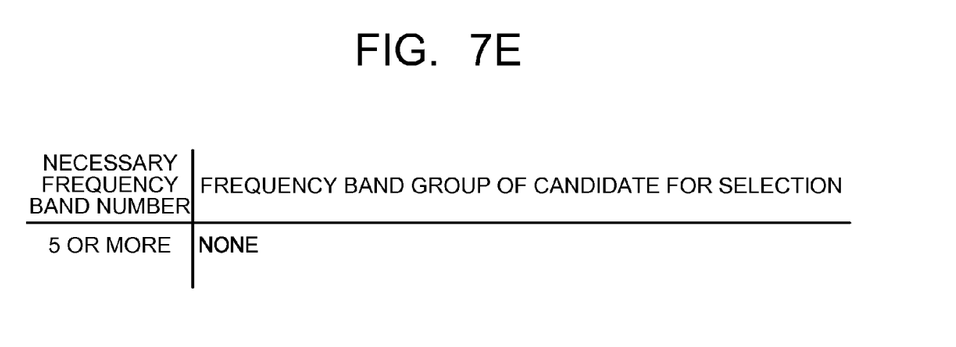
FIG. 7E is an explanatory diagram illustrating candidates for frequency band groups which can be selected by the use frequency band group selecting unit 16A illustrated in FIG. 6.

Next, still another embodiment will be described with reference to FIG. 6. FIG. 6 is a functional block diagram illustrating a configuration of a communication device which is still another embodiment. In this diagram, components illustrated in already described diagrams are given the same numerals, and descriptions thereof are omitted. This embodiment is configured for the purpose of further load reduction as a communication device.

A necessary frequency band number determining unit 15A is similar in function itself to that with the same name illustrated in FIG. 1, but information of the determined necessary frequency band number is also passed to a database inquiry unit 12A. Based on this, the database inquiry unit 12A also transmits the information of the necessary frequency band number passed from the determining unit 15A to the database in addition to the geographical position passed from the position specifying unit 11.

In response to this, the database first creates an available frequency band information list as illustrated in FIG. 3 based on the sent geographical position, and the database further refers to this list to create a list of any one of FIG. 7A to FIG. 7E based on the sent information of the necessary frequency band number. That is, a processing load in the database increases.

Then the database returns the list of any one of FIG. 7A to FIG. 7E to the database inquiry unit 12A. The returned list is passed from the database inquiry unit 12A to the list storage and retention unit 13A, and is stored and retained therein. Then, moreover, the stored and retained list is passed from the list storage and retention unit 13A to a use frequency band group selecting unit 16A.

The use frequency band group selecting unit 16A selects one frequency band group from among the frequency band groups in the list passed from the list storage and retention unit 13A as the frequency band group to be used. That is, FIG. 7A to FIG. 7E are diagrams illustrating candidates for frequency band groups which are selectable for the selecting unit 16A. Information of the frequency band group selected in the selecting unit 16A is passed to the control unit 17. After this performed is the same as the embodiment described with reference to FIG. 1.

In this embodiment, it is unnecessary to implicitly create the list as illustrated in FIG. 4 by the selecting unit 16A, and the list as illustrated in any of FIG. 7A to FIG. 7E is sent to the selecting unit 16A from the database. Because of this, it is unnecessary for the list storage and retention unit 13A to retain all information of the available frequency band information list as illustrated in FIG. 2 or FIG. 3. Therefore, it is possible to further decrease the load as the communication device.

Note that in general, it is conceivable that the candidate list of frequency band groups having a frequency band number width that matches the necessary frequency band number is not sent from the database. This situation is the same as the embodiment already described with reference to FIG. 1. For example, when the necessary frequency band number is 1 but a frequency band group having a frequency band number width of 1 does not exist incidentally, the database returns and offers the list illustrated in FIG. 7B for example instead of the list illustrated in FIG. 7A.

Accordingly, in this case, the selecting unit 16A selects, from among the frequency band groups (frequency band groups 4, 7, 9, 12) having a frequency band number width (=2) larger than the necessary frequency band number, one frequency band group as a use frequency band group containing frequency bands to be used. The reason why it is called the "use frequency band group containing frequency bands to be used" is that the frequency bands to be actually used becomes a part of the group. Then, a series of consecutive frequency bands corresponding to the necessary frequency band number, which can be obtained from the necessary frequency band number determining unit 15A, is selected from among frequency bands belonging to the use frequency band group containing the frequency bands to be used as a use frequency band group. When the use frequency band group is selected by the selecting unit 16A in this manner, information thereof is passed to the control unit 17.

Incidentally, as to which series of frequency bands should be selected from among the frequency bands belonging to the use frequency band group containing the frequency bands to be used, selecting from an end of the frequency bands belonging to the group as much as possible does not cause fragmentation of available frequency bands and hence is considered preferable from the viewpoint of improving use efficiency of frequency bands. This point is the same as the description in the embodiment explained with reference to FIG. 1.

What is claimed is:

1. A communication device having a communication function unit, the communication device comprising:
   a storing unit configured to store and retain an available frequency band information list which lists available frequency bands that are categorized into frequency band groups, wherein each of the frequency band groups consists of a series of consecutive frequency bands and has a frequency band number width indicating a number of frequency bands included in the frequency band group;
   a determining unit configured to, based on specifications of a communication to be performed, determine a number of frequency bands according to a bandwidth necessary for the communication as a necessary frequency band number;

a first selecting unit configured to select, from among the frequency band groups listed in the available frequency band information list, one frequency band group whose frequency band number width matches the necessary frequency band number, as a first-type use frequency band group being a frequency band group to be used;

a second selecting unit configured to, when any of the frequency band number widths of the frequency band groups in the available frequency band information list do not match the necessary frequency band number, select, from among the frequency band groups listed in the available frequency band information list, one frequency band group whose frequency band number width is larger than and next close to the necessary frequency band number, as a frequency band group containing a frequency band to be used;

a third selecting unit configured to select a series of consecutive frequency bands corresponding to the necessary frequency band number from the frequency band group containing the frequency band to be used as a second-type use frequency band group; and a controlling unit configured to control the communication function unit so as to perform the communication using the first-type use frequency band group or the second-type use frequency band group.

2. The communication device according to claim 1, further comprising:

a specifying unit configured to specify a geographical position where an own device exists;

a transmitting unit configured to transmit the geographical position to a database;

a receiving unit configured to receive a second-type available frequency band information list sent from the database as information according to the geographical position before the available frequency band information list is stored and retained, wherein the second-type available frequency band information list lists the available frequency bands with a form not being categorized into the frequency band groups and not being given the frequency band number widths, to form part of the available frequency band information list;

a categorizing unit configured to, by checking a disposition of the available frequency bands listed in the second-type available frequency band information list, categorize each of the available frequency bands into second-type frequency band groups, wherein each of the second-type frequency band groups consists of a series of consecutive frequency bands, so as to obtain the frequency band groups; and a giving unit configured to give to each of the second-type frequency band groups a number of frequency bands included in the second-type frequency band group, the number corresponding to the frequency band number width of a corresponding frequency band group.

3. The communication device according to claim 1, further comprising:

a specifying unit configured to specify a geographical position where an own device exists;

a transmitting unit configured to transmit the geographical position to a database; and a receiving unit configured to receive the available frequency band information list transmitted from the database as information corresponding to the geographical position, the list being categorized into the frequency band groups and being given the frequency band number widths.

4. The communication device according to claim 1, further comprising:

a generating unit configured to, by performing frequency sensing in surroundings of an own device, generate a second-type available frequency band information list indicating the available frequency bands with a form not being categorized into the frequency band groups and not being given the frequency band number widths, to form a part of the available frequency band information list;

a categorizing unit configured to, by checking a disposition of the available frequency bands listed in the second-type available frequency band information list, categorize each of the available frequency bands into second-type frequency band groups, wherein each of the second-type frequency band groups consists of a series of consecutive frequency bands, so as to obtain the frequency band groups; and a giving unit configured to give to each of the second-type frequency band groups a number of frequency bands included in the second-type frequency band group, the number corresponding to the frequency band number width of a corresponding frequency band group.

5. A communication control method in a communication device having a communication function unit, the communication control method comprising:

storing and retaining an available frequency band information list which lists available frequency bands that are categorized into frequency band groups, wherein each of the frequency band groups consists of a series of consecutive frequency bands and has a frequency band number width indicating a number of frequency bands included in the frequency band group;

determining, based on specifications of a communication to be performed, a number of frequency bands according to a bandwidth necessary for the communication as a necessary frequency band number;

selecting, from among the frequency band groups listed in the available frequency band information list, one frequency band group whose frequency band number matches the necessary frequency band number, as a first-type use frequency band group being a frequency band group to be used;

when any of the frequency band number widths of the frequency band groups in the available frequency band information list do not match the necessary frequency band number, selecting, from among the frequency band groups listed in the available frequency band information list, one frequency band group whose frequency band number width is larger than and next close to the necessary frequency band number, as a frequency band group containing a frequency band to be used;

selecting a series of consecutive frequency bands corresponding to the necessary frequency band number from the frequency band group containing the frequency band to be used as a second-type use frequency band group; and controlling the communication function unit so as to perform the communication using the first-type use frequency band group or the second-type use frequency band group.

6. A communication device having a communication function unit, the communication device comprising:

a specifying unit configured to specify a geographical position where an own device exists;
a determining unit configured to, based on specifications of a communication to be performed, determine a number of frequency bands according to a bandwidth necessary for the communication as a necessary frequency band number;
a transmitting unit configured to transmit the geographical position and the necessary frequency band number to a database;
a receiving unit configured to receive a list which lists one or more frequency band groups sent from the database as information corresponding to the geographical position and the necessary frequency band number, wherein each of the one or more frequency band groups consists of a series of consecutive available frequency bands whose frequency band number width indicating a number of frequency bands matches the necessary frequency band number or is larger than the necessary frequency band number;
a first selecting unit configured to select, from among the one or more frequency band groups listed in the list, one frequency band group whose frequency band number width indicating the number of frequency bands matches the necessary frequency band number, as a first-type use frequency band group being a frequency band group to be used;
a second selecting unit configured to, when any of the frequency band number widths of the one or more frequency band groups in the list does not match the necessary frequency band number, select, from among the one or more frequency band groups listed in the list, one frequency band group whose frequency band number width indicating the number of frequency bands is larger than the necessary frequency band number, as a frequency band group containing a frequency band to be used;
a third selecting unit configured to select a series of consecutive frequency bands corresponding to the necessary frequency band number from the frequency band group containing the frequency band to be used as a second-type use frequency band group; and
a controlling unit configured to control the communication function unit so as to perform the communication using the first-type use frequency band group or the second-type use frequency band group.

* * * * *